United States Patent
Froger et al.

(10) Patent No.: US 6,339,335 B1
(45) Date of Patent: Jan. 15, 2002

(54) METHOD AND DEVICE FOR DETERMINING THE QUANTITY OF PRODUCT CONTAINED IN A RESERVOIR, FOR EXAMPLE IN AN INK RESERVOIR FOR A PRINTER

(75) Inventors: Marie-Hëlëne Froger, Chateaugiron; Pascal Coudray, La Chapelle des Fougeretz; Mickaël Lorgeoux, Rennes, all of (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/168,718

(22) Filed: Oct. 9, 1998

(30) Foreign Application Priority Data

Oct. 10, 1997 (FR) ............................................. 97 12723
Oct. 10, 1997 (FR) ............................................. 97 12722
Nov. 3, 1997 (FR) ............................................. 97 13786

(51) Int. Cl.[7] ............................................. G01N 27/00
(52) U.S. Cl. ....................................... 324/636; 324/71.1
(58) Field of Search ................................. 324/71.1, 204, 324/207.15, 652, 655; 222/52, 57, DIG. 1; 340/592, 604, 855.7, 870.37, 870.31, 603; 73/304 C, 579, 149, 304 R, 861.08; 347/7, 19; 141/95, 83, 198, 392

(56) References Cited

U.S. PATENT DOCUMENTS 5,273,075 A 12/1993 Skaer
5,427,150 A 6/1995 Skaer et al.
D362,294 S 9/1995 Skaer et al.
5,682,184 A * 10/1997 Stephany et al. ............... 347/7

FOREIGN PATENT DOCUMENTS

| DE | 3043810 | 6/1982 |
|---|---|---|
| EP | 28399 | 5/1981 |
| EP | 261353 | 3/1988 |
| JP | 62-269021 | 11/1987 |
| JP | 62-274222 | 11/1987 |

* cited by examiner

Primary Examiner—Glenn W. Brown
Assistant Examiner—Etienne LeRoux
(74) Attorney, Agent, or Firm—Fitzpatrick, Cella, Harper & Scinto

(57) ABSTRACT

For determining the quantity of an electrically conductive product contained in a reservoir made of electrically insulating material, having at least one storage cavity:

a resonant circuit is formed, including a capacitive arrangement comprising at least part of this reservoir;

a processing procedure is defined, consisting of identifying, from a plurality of signals corresponding to different frequencies, the value of a characteristic of this resonant circuit, deriving from this value of the characteristic a measurement of the resistance constituted by the product contained in the reservoir in the said capacitive arrangement and deriving therefrom the instantaneous value of an item of information representing the quantity of product contained in the reservoir from a pre-established correlation law; and a least one determination cycle is effected, consisting of triggering the measurement procedure and the processing procedure, and capturing the instantaneous value of the said item of information.

78 Claims, 11 Drawing Sheets

METHOD AND DEVICE FOR DETERMINING THE QUANTITY OF PRODUCT CONTAINED IN A RESERVOIR, FOR EXAMPLE IN AN INK RESERVOIR FOR A PRINTER

The invention concerns a method and a device for determining the quantity of product contained in a reservoir, for example in an ink reservoir for a printer, for example by measuring a resistance representing this quantity, preferably even when the reservoir is in a noise environment.

Methods have already been proposed for detecting the residual quantity of available ink contained in ink reservoirs within printing devices.

Some of these methods are based on a measurement of resistance variation.

Thus the document EP-A-0 370 765 describes a method for detecting the presence of an electrically conductive ink in the ink discharge pipe which connects a storage cavity of the reservoir to an ejection or print head. Two electrodes are placed in this pipe: an absence of ink in the pipe (because of the exhaustion of the ink contained in the cavity or because this ink has dried in the pipe, notably) is easily detectable by the abrupt increase in resistivity between the electrodes.

The document EP-A-0 509 747 for its part discloses disposing two electrodes in two zones of a porous body contained in the reservoir and soaked with the ink in question, these two zones being chosen so as to have different capillarities. The variations in the concentration of ink within the porous body has an influence on the resistivity of the area of the porous body between the electrodes, which makes it possible to detect the quantity of ink.

These methods have a certain number of defects, the main one of which is that installing the electrodes requires an adaptation of the reservoir (the term cartridge is sometimes used to designate the exchangeable assembly of which the reservoir forms part), namely its cavity or its discharge pipe. This gives rise to a certain degree of complexity and therefore an increase in the cost of producing the reservoirs or cartridges.

Moreover, these electrodes are in direct contact with the ink, which is often corrosive, which obliges the manufacture to use noble materials (gold, etc), which are therefore expensive.

Finally, the first aforementioned document does not afford a true determination of the residual ink, since it monitors only the resistive state of the pipe through which the ink flows, whilst the second document discloses only detecting the passing of a threshold or residual ink level without the user being able to know the quantity of ink remaining in the reservoir as long as this threshold has not been passed.

Other methods involve a measurement of apparent capacitance.

Thus for example the document EP-A-0 028 399 describes a detection method using an resonant circuit with which the reservoir to be monitored is integrated. More precisely, the capacitor of this resonant circuit has two metal plates forming electrodes defining a dielectric space in which the storage cavity of the ink reservoir is situated.

The ink thus behaves as a dielectric whose value changes as the ink reserve decreases. Consequently the capacitance of the resonant circuit also changes.

The latter is calibrated so that its resonant frequency, and therefore the maximum voltage at its resistor, is reached when the level of the ink reserve has dropped to a predetermined value. When this threshold is passed, a signal is activated.

This method has a certain number of defects.

When the ink level decreases, the voltage at the terminals of the resistor varies up to a certain threshold. The only information given by this device is therefore an indication on the situation (greater or not) of this level with respect to the threshold.

Only the information relating to the amplitude of the measurement signal is taken into account and compared with a threshold; this type of detector indicates only one type of information: when 20% of the ink remains in the reservoir. By using an analogue to digital converter, determining the level of ink in the reservoir continuously could be considered, but this type of component has a high cost.

In addition, when it is wished to measure the quantity of ink present in small reservoirs or when the capacitance is of low value (a few picofarads), the resonant frequency then becomes extremely high, which appreciably increases the cost of the components used and may generate electromagnetic interference. One solution would consist of using inductors of very high value (1 henry for example). These would reduce the frequency, but they are very difficult to produce and are bulky.

It is briefly mentioned in this document that it is possible to use a parallel circuit but it is added that a series circuit is preferable.

The ink plotters such as the one mentioned in the description have a reservoir and a recorder. The reservoir and recorder are not electrically connected to the printing device, which of course makes it possible to place the capacitor consisting of metal plates and ink reservoir in a series or parallel configuration.

Likewise, conventional wound inductors can be placed equally well in a series or parallel configuration.

It must nevertheless be noted that:
if the recorder is for example connected to a potential, for example earth, the series resonant circuit cannot be produced; this case is however increasingly usual;
if the capacitance is very small, it is necessary to produce inductors with very high values if it is desired to remain within low frequencies, which cannot be achieved in conventional technologies.

In any event, the known solutions are not suitable for dealing with cases where, at the time of the measurements, the reservoir and the associated detection means are in a noisy environment and because of that suffer interference leading to erroneous measurements.

A first object of the invention is to mitigate the aforementioned drawbacks by virtue of a method or device which allows the detection, at least within an operating range including preferably the low values, of the residual quantity of an electrically conductive product contained in a reservoir made of electrically insulating material, in a simple, precise and reliable fashion, by measuring a resistance characterising the reservoir when the latter is included in a resonant circuit, without having to modify the latter in any way.

A second object of the invention is to mitigate the aforementioned drawbacks by virtue of a method or device which allows the detection, at least within an operating range preferably including low values, of the residual quantity of an electrically conductive product contained in a reservoir made of electrically insulating material, in a simple, precise and reliable fashion, in particular by eliminating the effects of the environment, such as electromagnetic noise, and this by means of measurements which require no modification to the reservoir in order to fit electrodes.

Additionally (but these aspects can be taken into consideration independently of each other and of the aforementioned object) the invention aims to achieve this object:

even when the technological constraints of location and operation of the system receiving the reservoir allow the formation only of a resonant circuit of the parallel type (in particular when the reservoir includes, or cooperates with, a print head whose operation requires an electrical connection of the said head to a predetermined potential, which prevents any series connection);

at a moderate cost and within a moderate size, in particular without using components which are difficult to produce and/or expensive in the resonant circuit itself or in the generator designed to deliver excitation signals to this resonant circuit;

while easily allowing the detection also of situations where there is no product in a duct delivering product to a print or ejection head (therefore minimizing the additional components to be provided when it is desired not only to detect the quantity of product in a storage cavity of this reservoir but also to check, in real time, that there is indeed, in the delivery duct, product in a normal state, that is to say electrically conductive).

According to a first aspect, the invention proposes a method of determining the quantity of an electrically conductive product contained in a reservoir made of electrically insulating material having at least one storage cavity, according to which:

a resonant circuit is formed having a capacitive arrangement comprising at least part of this reservoir;

this resonant circuit is connected to an excitation signal generator;

a measurement procedure is defined according to which a plurality of excitation signals is applied to this resonant circuit having different frequencies included in a predetermined frequency range and a plurality of measurement signals are taken off at a measuring point in response to these excitation signals, this frequency range being chosen so as to contain the frequencies at which the resonant circuit is in resonance for a plurality of values of the quantity of product within a predetermined operating range;

a processing procedure is defined consisting of identifying the value of a characteristic of this resonant circuit from this plurality of measurement signals, deriving from this value of the characteristic a measurement of the resistance formed by the product contained in the reservoir in the said capacitive arrangement and deriving therefrom the instantaneous value of an item of information representing the quantity of product contained in the reservoir using a pre-established correlation law; and at least one determination cycle is effected, consisting of triggering the measurement procedure and the processing procedure, and capturing the instantaneous value of the said item of information.

In fact, it is already known that attempts can be made to evaluate the quantity of product contained in a reservoir by exciting the resonant circuit with which there is integrated, within a capacitive arrangement, at least part of the reservoir (see for example the document EP-A-0 028 399), although this is generally for detecting only the fact that a minimum filling threshold has been passed. It is then the value of the capacitance formed by the reservoir within the resonant circuit which is of interest. However, assimilating the reservoir to a pure capacitance is a simplification of reality, so that it is more exact to take account, in the processing of the measurement signals, of the fact that the combination of two electrodes and a reservoir, at least part of which is disposed in the dielectric space defined by these electrodes, should be analysed as the connection in series of a resistance (represented by the product in the reservoir) between two capacitors (of substantially constant characteristics) each formed by one of the electrodes, the thickness of the wall of the chamber delimiting the cavity and the said product. This complicates the processing of the measurement signals, but in an entirely reasonable fashion, and leads to evaluations of the quantity of product which are much more precise.

The more the resistance between the capacitors varies greatly, which is notably the case when the cavity contains a porous body impregnated with the said product, the more such an electrical analysis of the reservoir in the resonant circuit is useful, and leads to measurements which are all the more precise. The invention is therefore particularly well suited to monitoring the consumption of the product when the latter impregnates a porous body disposed in the storage cavity of the reservoir; the capacitive arrangement then comprises part of this porous body.

The characteristic of the resonant circuit can quite simply be the amplitude of the resonance peak.

However, it may appear more precise to choose to evaluate the resistance from the measurement of the quality factor Q of this resonant circuit (the width of the resonance peak for a signal threshold representing the amplitude of the resonance peak reduced by 3 dB). It did in fact become clear that it varied univocally with the quantity of a product such as an ink.

According to a second aspect, the invention proposes a method of determining the quantity of an electrically conductive product contained in a reservoir made of electrically insulating material having at least one storage cavity, according to which:

a resonant circuit is formed, including a capacitive arrangement comprising at least part of this reservoir, this resonant circuit having at least two states;

this resonant circuit is connected to an excitation signal generator and to means adapted to cause the resonant circuit to change from a first to at least one other state;

a measurement procedure is defined according to which at least one excitation signal is applied to this resonant circuit and at least one measurement signal is taken off at a measurement point in response to this excitation signal, this excitation signal being chosen so that the measurement signal varies univocally with the quantity of product contained in the storage cavity;

for each state of the resonant circuit a processing procedure is defined, including a first step consisting of identifying, from this measurement signal or signals, the value of a characteristic of this capacitive arrangement, and a second step consisting of deriving therefrom the instantaneous value of an item of information representing the quantity of product contained in the reservoir from a pre-established law of correlation between values of this characteristic and values of the quantity of product in the storage cavity;

a verification procedure is defined consisting of comparing the value of this characteristic or of this item of information with a possible range of values; and at least one determination cycle is effected, consisting of putting the resonant circuit in its first state, triggering the measurement procedure and optionally the processing procedure associated with this first state, then the verification procedure and, if the verification is positive, capturing the instantaneous value of the said item of information or, if not, demanding a change of state of the resonant circuit when this verification procedure detects that the value is outside its range and once again triggering the measurement procedure and then the processing procedure for this new state of the resonant circuit and capturing the new instantaneous value of the said item of information.

Thus, in summary, the invention proposes to dispose at least part of the reservoir in a capacitive arrangement within a resonant circuit, to excite this circuit so as to be able to evaluate a characteristic of this circuit, to derive therefrom the instantaneous value of an item of information representing the quantity of product in the reservoir but, before ending the processing of the measurement signal or signals, to check that the quantities involved in this processing are plausible; if this test is positive the processing is continued (if it was not ended at the time of the test), but if this test is negative the resonant circuit is modified before commencing once again to excite the resonant circuit, to evaluate a characteristic of this circuit in its new state, and to derive therefrom the required information.

Preferably, there is a plausibility test which is triggered during the processing (or at the end thereof), not only when the resonant circuit is in its first state, but also after it has changed state following a first negative test. Preferably, in order to deal with cases where the second plausibility test is also negative, the resonant circuit is advantageously designed so as to allow a third state (more generally, there may be a plurality of possible states which are tested successively until it is found that the plausibility test becomes positive). However, it is preferable to trigger the verification procedure with regard to each processing, and thus avoid giving a result which may be false.

In fact, it appeared that the noise liable to falsify the results is generally electromagnetic noise in a very narrow frequency band: this may lead to aberrant results when the resonant circuit is excited in this frequency band, with the appearance of "fallacious" resonances. However, it suffices to modify the resonant circuit so that the resonant frequencies corresponding to the possible concentrations of product become substantially separate from the frequency band of the noise: the latter is then neutralised and the results can be considered to be reliable. It suffices to design the excitation signal generator so that it is capable of generating signals with frequencies contained in the various frequency ranges in which the circuit can come into resonance as a function of its state.

The resonant circuit can be modified by acting on an element whose capacitance or inductance is variable. It is however much simpler and less expensive to make provision for this modification to take place by simple substitution or by simple addition of components, by acting on simple switches.

The measurement procedure preferably includes the application to the circuit of a plurality of signals having different frequencies, in a frequency band containing the resonant frequencies of the resonant circuit for various values of the quantity of product.

Preferably, the verification procedure consists of testing the plausibility of the information, rather than that of an intermediate quantity: this thus tests the correct progress of the processing procedure itself.

The characteristic of the resonant circuit which is identified can notably be the capacitance formed by the reservoir in the capacitive arrangement: it can easily be evaluated, for example by detecting the amplitude of the resonance peak or by another characteristic of this peak.

However, it may turn out to be more precise to seek to evaluate the resistive component of the capacitance (in the broad sense of the term) formed by the reservoir in the capacitive arrangement.

However, assimilating the reservoir to a pure capacitance is a simplification of reality, so that it is more exact to take account, in the processing of the measurement signals, of the fact that the combination of two electrodes and a reservoir, at least part of which is disposed in the dielectric space defined by these electrodes, should be analysed as the connection in series of a resistance (represented by the product in the reservoir) between two capacitors (of substantially constant characteristics) each formed by one of the electrodes, the thickness of the wall of the chamber delimiting the cavity and the said product. This perhaps complicates the processing of the measurement signals, but in an entirely reasonable fashion, and leads to evaluations of the quantity of product which are much more precise.

The more the resistance between the capacitors varies, which is notably the case when the cavity contains a porous body impregnated with the said product, the more such an electrical analysis of the reservoir in the resonant circuit is useful, and leads to measurements which are all the more precise. The invention is therefore particularly well suited to monitoring the consumption of the product when the latter impregnates a porous body disposed in the storage cavity of the reservoir.

The modification of the resonant circuit is advantageously achieved by modifying a component of the notional inductor (when it is present), for example by modifying the capacitance, taking advantage of the amplification effect which is produced, for example, by the gyrator circuit.

One of the possible sources of cost in implementing the methods of the invention lies in the need to be able to generate excitation signals at frequencies close to the resonant frequency. Preferably, when possible, the invention is implemented in the range of low or medium frequencies (approximately 1 kHz to approximately 100 kHz). This can sometimes be easily achieved, having regard to the nature of the product and the geometry and dimensions of the reservoir, by using conventional components for producing the resonant circuit.

In the field of printing machines the capacitance values typically encountered with ink reservoirs lead on the other hand to resonant frequencies in the field of high frequencies (beyond around 1 megahertz), unless it is possible to use inductors of very high values which, when they exist, are very expensive.

The advantage of using, according to a preferred characteristic of the invention, a notional inductor is that it is possible to simulate high-value inductors easily without using components which are complex or difficult to produce. A so-called "gyrator" circuit is thus known which, with a few resistors and two amplifiers, makes it possible to simulate a high constant inductance using a constant capacitance of conventional value (typically around scarcely a few picofarads) of moderate cost and bulk. However, it became clear that installing such resistors and such amplifiers entailed in itself only a moderate increase in cost and bulk, so that such a gyrator led itself very well, in spite of appearances, to forming notional inductors of high value at a cost and within an overall bulk which were entirely moderate, including when operating in the field of office printing machines. The invention makes it possible, as desired, to dispose the reservoir in the capacitive arm or in the inductive arm of the resonant circuit, but location in the capacitive arm may be preferred since it leads to a fairly easy processing procedure; the capacitive arrangement and the notional inductor are therefore advantageously distinct from each other.

It may be noted that the method (in its two aspects) lends itself very well to a parallel connection of the capacitive and inductive components of the resonant circuit, which makes it applicable to any type of reservoir, whatever the type of associated ejection or print heads. For reasons of simplicity or to meet operating constraints, these components are advantageously connected between a measuring point and earth.

Preferably, the capacitive arrangement includes two metallic parts forming the electrodes of a capacitor, one of which is disposed in the immediate vicinity and opposite a portion of the storage chamber of the reservoir, and the other one of which is formed by, or connected to, an ejection or print head connected to the storage chamber by a connecting or delivery duct, by virtue of which the capacitive arrangement takes account not only of the quantity of product in the chamber but also in the connecting duct. Such an assembly makes it possible to add, to the parts necessary for the operation of the head, only a single metal part.

The operation of certain print heads currently known makes it necessary for the latter to be connected to earth: this is why, the resonant circuit then being of the parallel type, the print or ejection head is advantageously connected to a reference potential formed by earth.

The invention applies notably to the case of printing machines using a reservoir, generally removable, containing an electrically conductive ink: the resonant circuit, including the first electrode, is then advantageously fixed with respect to the casing of the printing machine.

It is very easy to adapt the method of the invention for monitoring the state of the product in the delivery duct, whether there is a lack of it, or whether it dries up, notably. The characteristics of the capacitive arrangement, when the latter includes the delivery pipe, are then fundamentally modified, leading in practice to values, whether before or after processing, which are entirely different from the values which can normally be obtained: it suffices to provide for a test in this regard and an abnormality procedure (excitation of an audible or light signal for example) to be triggered as appropriate.

It is clear that the information concerning the quantity of product can be of at least two natures, depending on whether concern is with the quantity already consumed or the residual quantity.

The excitation signals are preferably alternating signals, but can also, in a variant, be square-wave or pulsed signals.

The invention also proposes, for implementing the first method, a device for determining the quantity of an electrically conductive product contained in a storage cavity made of electrically insulating material, having:
- a resonant circuit including a capacitive arrangement designed to comprise at least part of this reservoir, this circuit having, for various possible values of the quantity of product contained in a given operating range, resonant frequencies contained within a predetermined frequency range;
- an excitation signal generator connected to the resonant circuit and adapted to generate various frequencies belonging to this predetermined range;
- measurement and processing means connected to this resonant circuit and to the excitation signal generator and designed so as to apply to the resonant circuit a plurality of excitation signals having various frequencies within the said predetermined range, to detect a measurement signal in response to each excitation signal, and to identify from this plurality of measurement signals the value of a characteristic of this resonant circuit, to derive from this value of the characteristic a measurement of the resistance formed by the product contained in the reservoir in the said capacitive arrangement and to derive therefrom the instantaneous value of an item of information representing the quantity of product contained in the reservoir from a pre-established correlation law; and
- means for capturing the instantaneous value of the said information.

The invention further proposes, for implementing the second method, a device for determining the quantity of an electrically insulated product contained in a storage cavity of a reservoir made of electrically conductive material, having:
- a resonant circuit including a capacitive arrangement designed to comprise at least part of this reservoir, this circuit having at least a first state and a second state;
- control means for causing this resonant circuit to change from the first state to the second state;
- an excitation signal generator connected to the circuit;
- measurement and processing means connected to this resonant circuit, to the excitation signal generator and to the control means, and designed so as to apply at least one excitation signal to the resonant circuit, to take off a measurement signal in response to each excitation signal, to identify the value of a characteristic of this capacitive arrangement and to derive therefrom an item of information representing the quantity of product contained in the storage cavity using a pre-established correlation law;
- verification means designed so as to compare the value of this characteristic or of this item of information with a range of possible values;
- determination means designed so as to put the resonant circuit in its first state, to trigger the measurement procedure and optionally the processing procedure associated with this first state, and then the verification procedure, and;
- if the verification is positive, to capture the instantaneous value of the said item of information;
- or otherwise to demand a change of state of the resonant circuit when this verification procedure detects that the value is outside its range and to trigger once again the measurement procedure and then the processing procedure for this new state of the resonant circuit and to capture the new instantaneous value of the said item of information.

The same comments as before apply to the device thus defined.

The invention also concerns a signal processing device formed by measurement and processing means and means for capturing the instantaneous value of the information sought.

The invention applies finally to:
- a product supply device combining a device for determining the quantity of product with the reservoir and the means of controlling the ejection head;
- the particular case, important in practice, where this product supply device is an image forming device;
- a printing system including only the device for determining the quantity of product with the reservoir, in the case of an ink reservoir;
- an office machine including any one of the aforementioned devices; and
- an office signal processing unit designed to cooperate with an ink reservoir and including a processing device of the aforementioned type;

a means, fixed or partially or totally removable, of storing information which can be read by a computer or microprocessor storing instructions of a computer program, characterised in that it enables the methods of the invention as briefly disclosed to be implemented, and a means, fixed or partially or totally removable, of storing information, which can be read by a computer or a microprocessor storing data resulting from the implementation of the methods as briefly disclosed above.

It will be appreciated that, according to the first aspect, the invention makes it possible:

to establish a univocal relationship between the quantity of ink remaining and the value of the resistance calculated by means of the quality factor or the signal amplitude at the resonant frequency, to produce a level-measurement system integrated into the print device and requiring no modification to the ink cartridge;

to reduce the bulk of the mechanical configuration by using the print head as the second plate of the capacitor;

to use low excitation frequencies by means of an appropriate choice of the components of a circuit of the gyrator type as an inductor.

It will be appreciated that, according to the second aspect, the invention seeks to determine a frequency range where the ambient noise does not interfere with the measurement of the quantity of product.

It can use a linear relationship between the remaining quantity of ink and the value of the resistance calculated by means of the quality factor or the signal amplitude at the resonant frequency.

It makes it possible to reduce the bulk of the mechanical configuration by using the print head as the second plate of the capacitor.

It can be implemented with low or medium frequencies by using a circuit of the gyrator type as an inductor.

It can use, in a variant, a univocal relationship between the remaining quantity of ink and the value of the capacitance calculated from the resonant frequency.

Objects, characteristics and advantages of the invention will emerge from the description which had been given by way of example with regard to the accompanying drawings in which.

Figure 1:
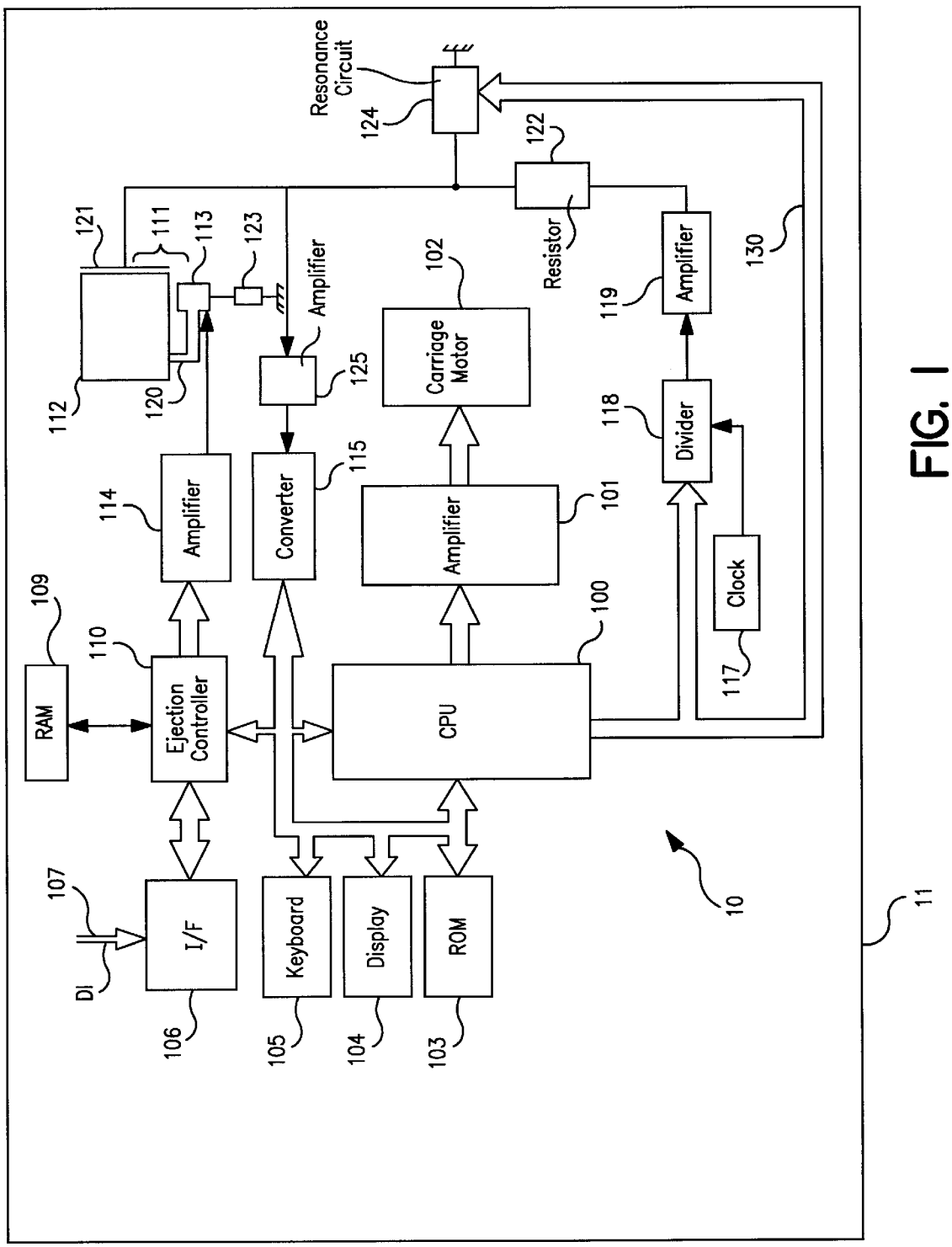
FIG. 1 is a block diagram of the printing device.

As is clear from FIG. 1, the invention applies to an image transfer device 10, for example included in a printer 11 which receives data to be printed DI by means of a parallel input/output port 107 connected to an interface circuit 106. The circuit 106 is connected to an ink ejection control circuit 110 which controls an ink cartridge or reservoir 111, via an amplification circuit 114.

The ink cartridge 111 is exchangeable and is mounted on a reciprocating carriage actuated by a motor 102.

The ink cartridge comprises essentially an ink storage chamber or cavity 112, a delivery pipe or duct 120 connected to the outlet of the chamber and a print head 113 connected to the chamber by this duct. The reservoir is made from electrically insulating material (conventional plastic) and contains electrically conductive ink.

The printer also includes a main data processing circuit 100, associated with a read only memory 103 and a random access memory 109. The read only memory 103 contains the operating programs for the main processing circuit 100, whilst the random access memory 109, also associated with the ink ejection control circuit 110, temporarily stores the data DI received by means of the interface 106 as well as the data processed by the main processing circuit 100.

The main processing circuit 100 is connected to a display 104, on which the main processing circuit 100 controls the display of messages representing the operation of the printer. The main processing circuit 100 is connected to a keyboard 105, incorporating at least one switch, by means of which the user can transmit operating controls to the printer.

The processing circuit 100 is also connected to the motor 102 by means of an amplification circuit 101. The motor 102 moves the carriage which carries the print cartridge 111. The motor 102 is for example a stepping motor. The printer described above is conventional and well known to persons skilled in the art. It will therefore not be detailed any further.

According to the invention, the printer has a metal plate or electrode 121 outside the plastic reservoir, which preferably contains a porous body soaked with ink whose resistivity varies proportionally to the quantity of ink. The print head consists of an insulating layer and then another conductive layer; advantageously, this head here forms part of (or even constitutes) the second electrode of the capacitive arrangement in which the reservoir is integrated; so that this head has a dual function whilst not only the storage cavity but also the duct 120 forms part of this arrangement. In a variant which is not shown, only part of the storage cavity forms part of this arrangement.

The printer also comprises a means 115 for converting the electrical signal from the plate 121, via an amplifier 125 of very high input impedance.

The main processing circuit 100 is connected to a programmable divider 118 adapted to divide the signal from a clock 117 with a variable ratio so as to obtain a frequency scanning simply by modifying the division ratio. This signal is amplified at 119.

It is connected to a resistive element 122 (in the case considered a resistance of 4.7 MΩ) and connected to the resonant circuit consisting of a so-called "gyrator" circuit 124 and the capacitor formed by the plate 121, reservoir 112 and print head 113.

The processing circuit 100 is advantageously connected to the gyrator circuit 124 in order to be able to modify the value of the equivalent inductance created by the said gyrator. Such connection is shown under reference 130.

Figure 2:
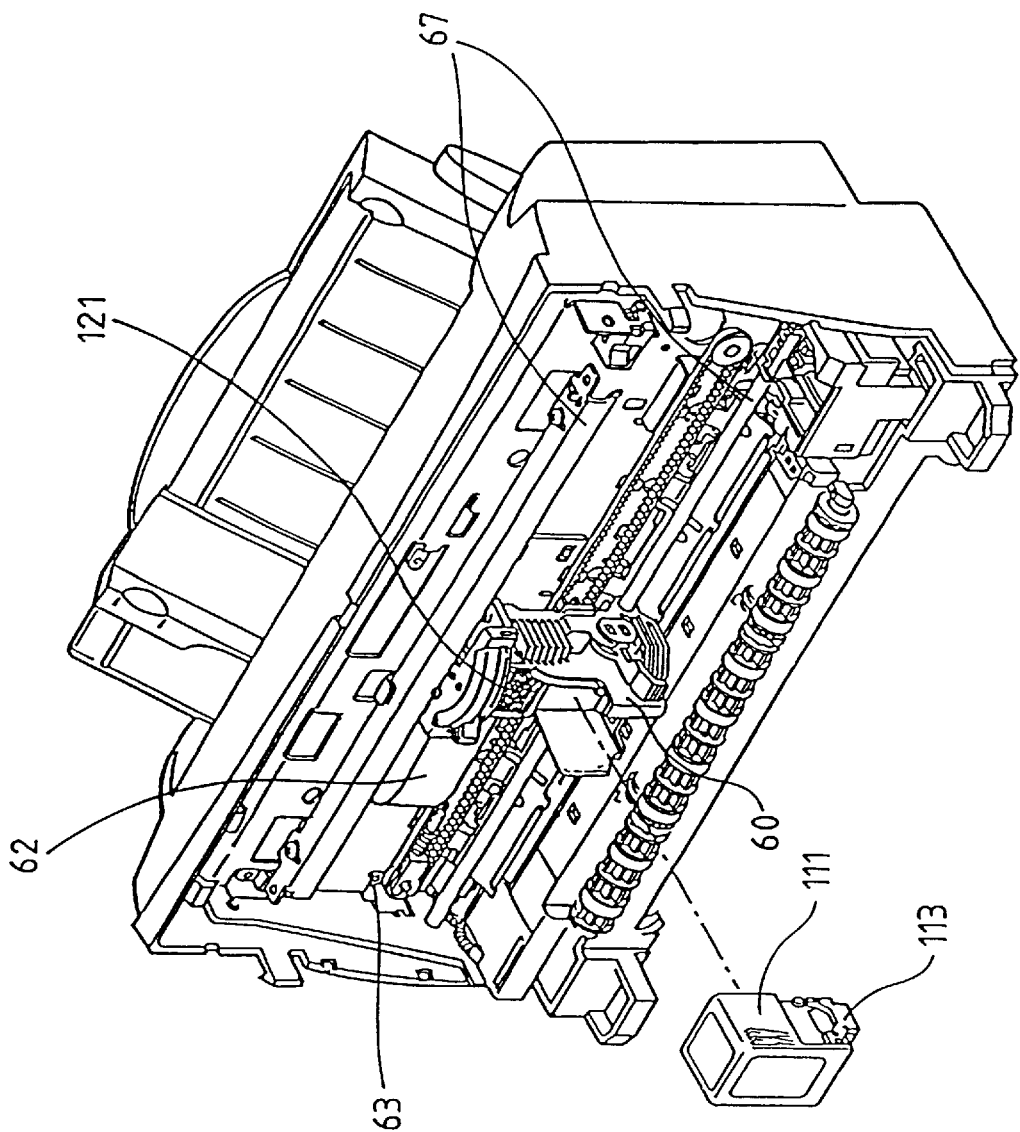
FIG. 2 is a simplified perspective of the printing device.

As it clear from FIG. 2, the printing device conventionally comprises a carriage 60 for carrying the print cartridges 111. The carriage is driven in a reciprocating movement on a movement path formed by guide rails 67. The motor drives the carriage 60 by means of a belt device 63.

The movement path of the print head 113 is parallel to a line on a printing medium, not shown, such as a sheet of paper. A flexible cable 62 connects the amplification circuit 114 to the cartridge 111, the amplifier 119 to the metal element 121 via a resonant circuit comprising a gyrator.

Figure 3:
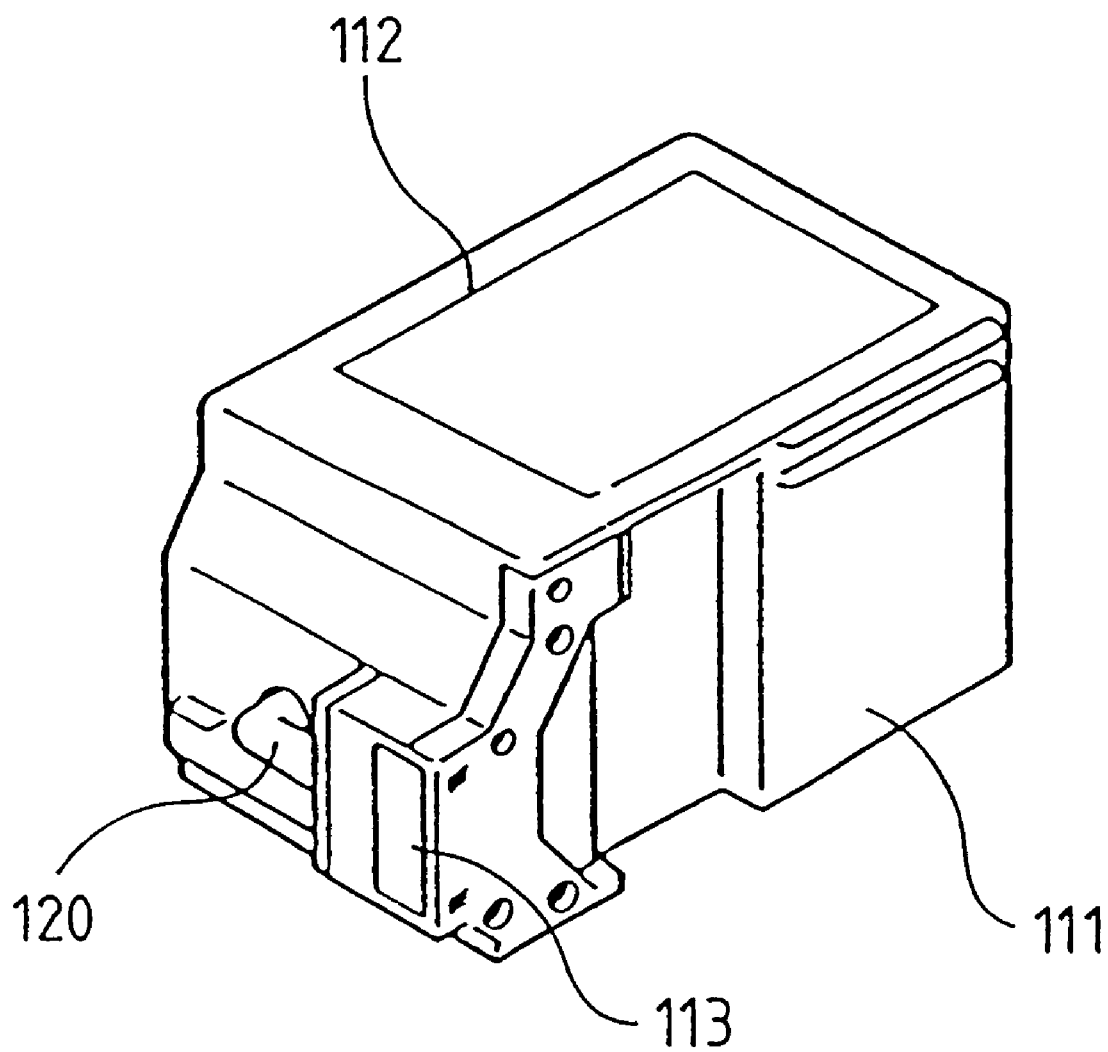
FIG. 3 is a simplified schematic view of the reservoir.

FIG. 3 is a perspective view of the ink cartridge 111. There can be seen the storage cavity 112, the connecting pipe 120 connecting this cavity to the print head and finally the print head 113 itself.

Figure 4:
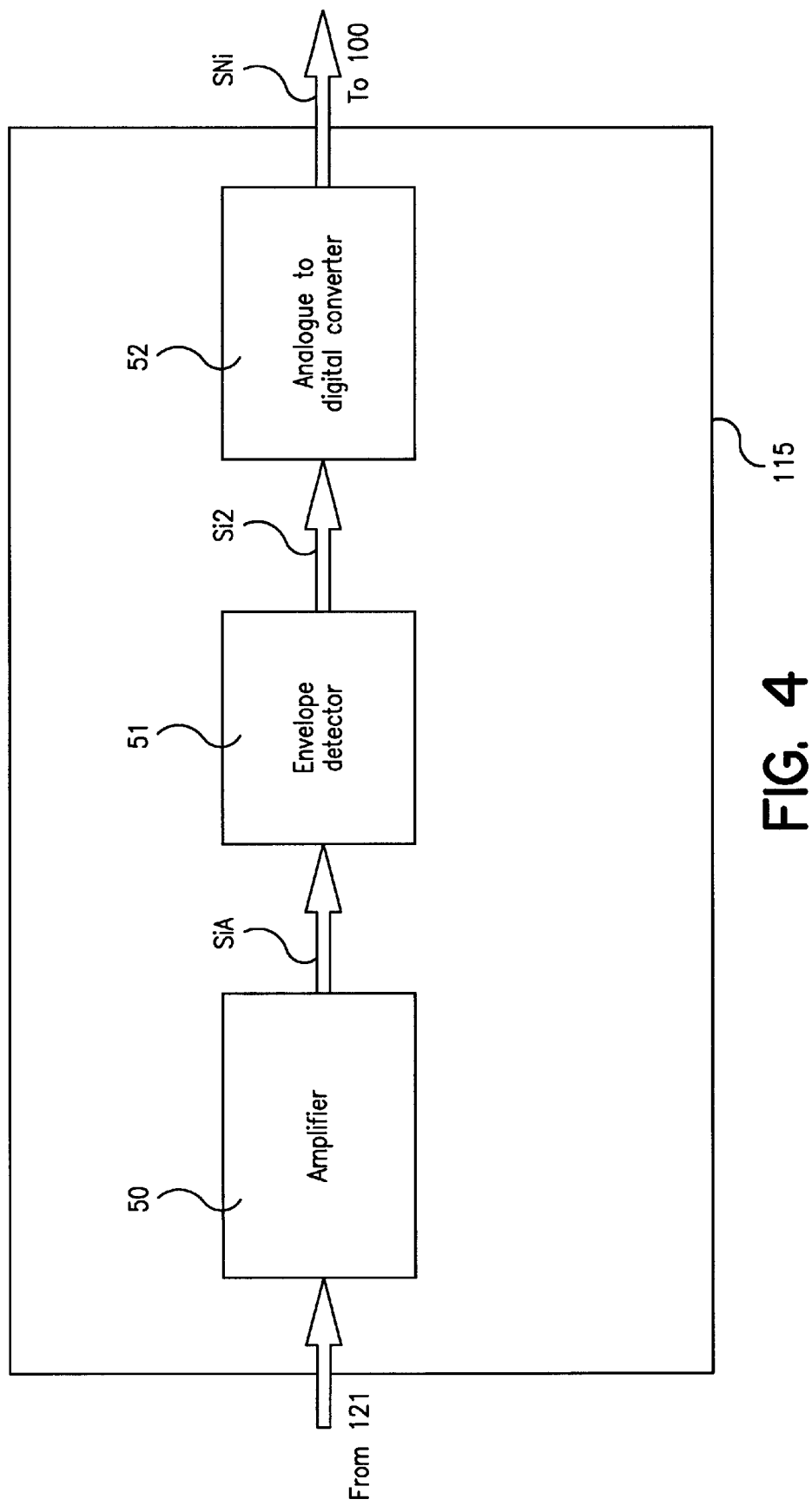
FIG. 4 is a block diagram of the device for processing the signal received.

FIG. 4 depicts the conversion circuit 115. The conversion circuit 115 comprises an amplifier 50 and an envelope detector 51. The envelope detector 51 is connected to a comparator 52 connected to the processing circuit 100.

The amplifier 50 supplies the amplified signal SiA to the envelope detector 51, which determines the peak value of the amplified signal. This makes it possible to measure the amplitude of the signal, the frequency of course being deduced by the Central Unit, which knows the frequency of the oscillator 117 and the division ratio.

The signal Si2 output from the envelope detector 51 is supplied to the converter 52, which converts the analogue signal Si2 into a digital signal SNi in order to transmit it to the processing circuit 100.

Figure 5:
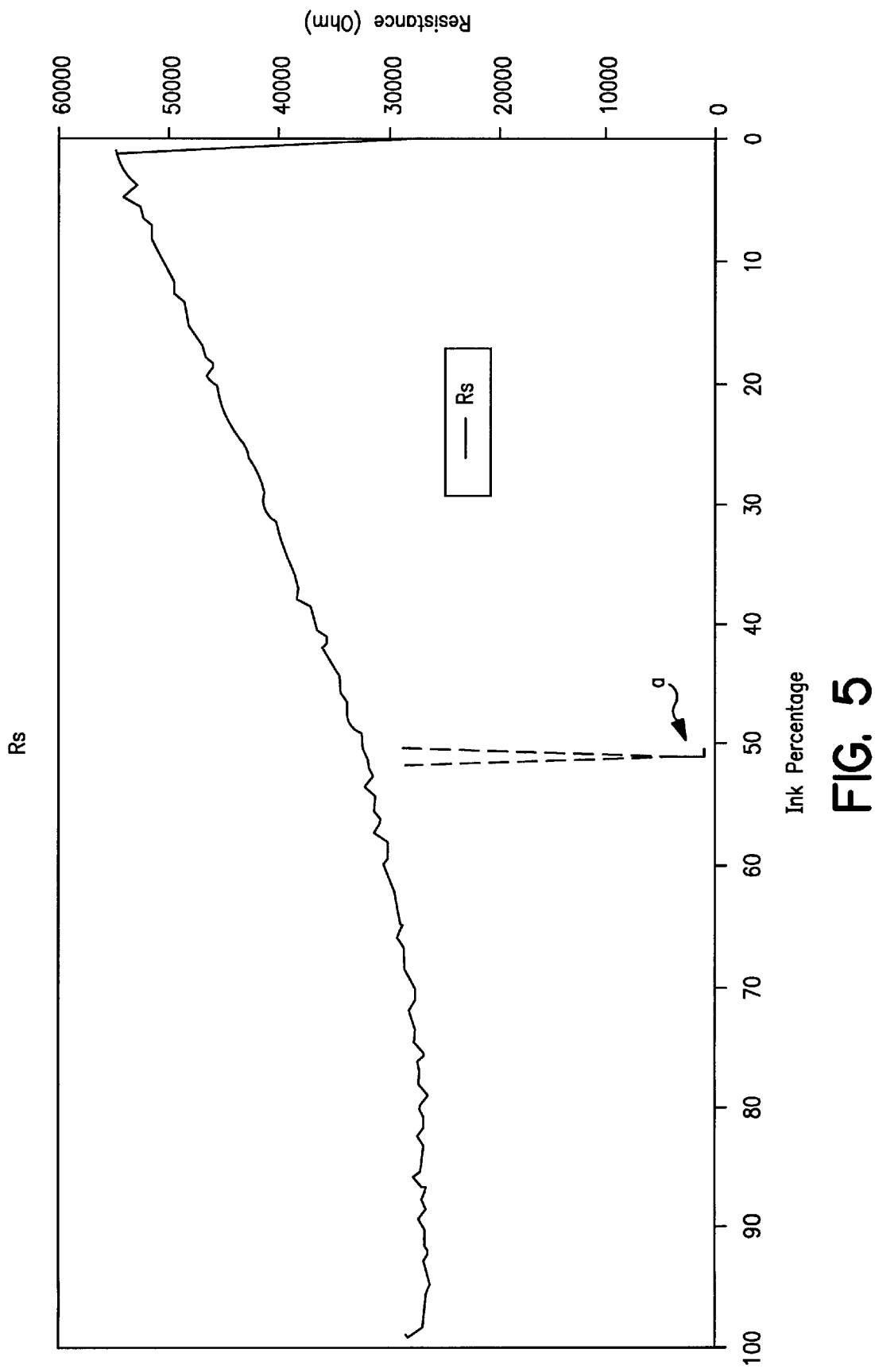
FIG. 5 is an example of results obtained by the invention.

FIG. 5 depicts an experimental curve which can be used by the invention as a correlation law. On the-X axis, the quantity of ink contained in the reservoir is expressed as a percentage of the maximum quantity. The value of the resistance expressed in ohms is on the Y-axis. At a is shown a peak corresponding to measurements disturbed by a noise. It shall of course be corrected before using such curve as a correlation law.

Figure 6:
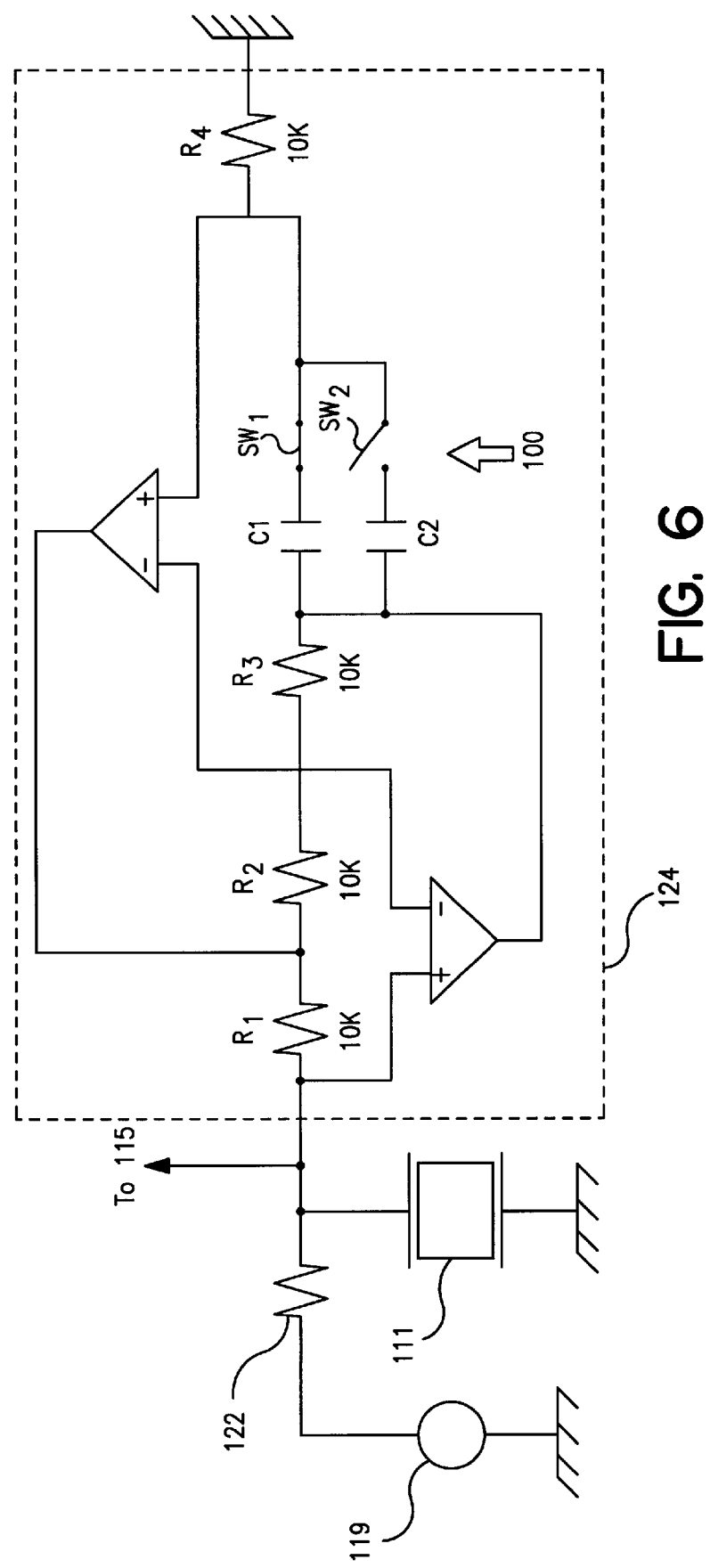
FIG. 6 is an electrical diagram of a gyrator circuit adapted to be used by the invention.

FIG. 6 depicts the electrical diagram of the gyrator circuit 124, within a resonant circuit including moreover the ink cartridge measured, the resistor 122 and the amplifier 119 delivering the excitation signal.

This type of gyrator circuit was invented by Antoniou, and is known by the English term GIC (General Impedance Converter). It has four resistors, a capacitor C1 (impedance Z), and two differential amplifiers; it transforms an impedance Z into another value:

$$Ze = \frac{R_1 R_3 R_4}{R_2 Z}$$

If $R_1=R_2=R_3=R_4=10$ KΩ then $Z_e = j(10\ K\Omega)^2\ C\omega$ where C represents a capacitor.

Consequently the value of the capacitance C is multiplied by a factor of $10^8$ in order to become an inductance.

Thus a capacitance of 10nF becomes an inductance of 1 H.

In the case considered here, the capacitance between ink and the metal plate 121 is a few picofarads. That of the head is several picofarads.

Thus it is possible to measure the resistance of the ink in series with low-value capacitances at low or medium frequencies (from a few kHz to a few tens of kHz). This is because the values of capacitances which the reservoir can take when the quantity of ink varies are below 5 pF.

In order to reduce the frequency still further, it suffices to increase the value of the capacitive element C1.

When the oscillator 117 varies its frequency, the voltage 115 at the measurement point becomes maximum at the resonant frequency, it is thus determined by the central unit in order thereafter to determine the passband, the quality factor and finally the equivalent resistance.

It should be noted that, if and when needed, a simple change in the value of an element of the gyrator ($R_1$, $R_2$, $R_3$, $R_4$ or C1) makes it possible to modify the value of the equivalent inductance simply and rapidly and by the same occasion to modify the resonant frequency of the tank circuit.

By way of example, it is chosen to change the value of C1 by means of switches $SW_1$, $SW_2$ and capacitors C1 and C2.

Thus it is possible to obtain a first value of the inductance $L_1$ representing C1 alone ($SW_1$ closed, $SW_2$ open), a second value $L_2$ representing C2 alone ($SW_1$ open, $SW_2$ closed), a third value $L_3$ representing C1 and C2 ($SW_1$ closed, $SW_2$ closed). Many other cases can be envisaged with a third capacitor and a third switch.

Figure 7A:
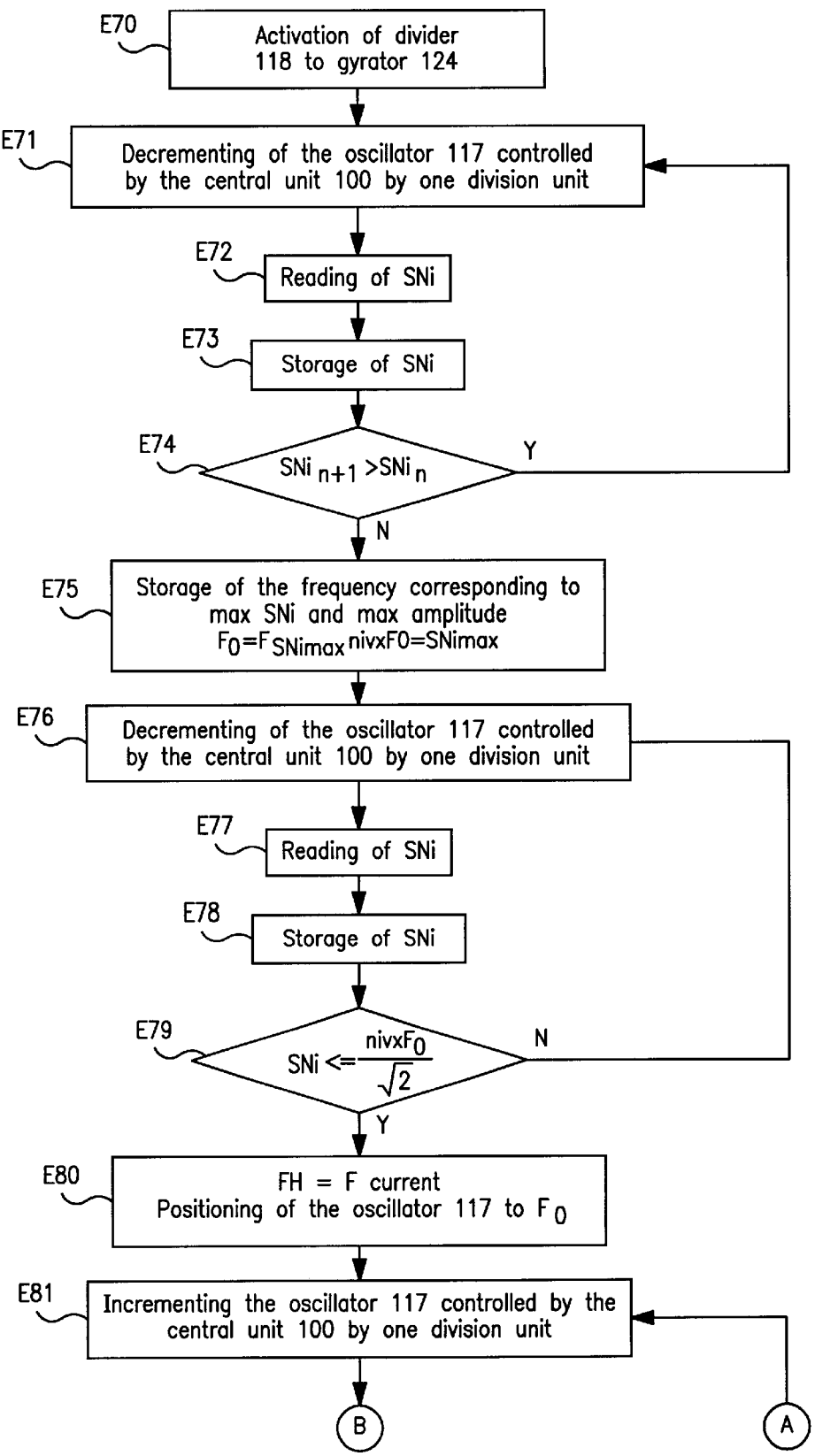
FIGS. 7a and 7b are conjointly a flow diagram of the program resident in read-only memory and implementing the invention.
Figure 7B:
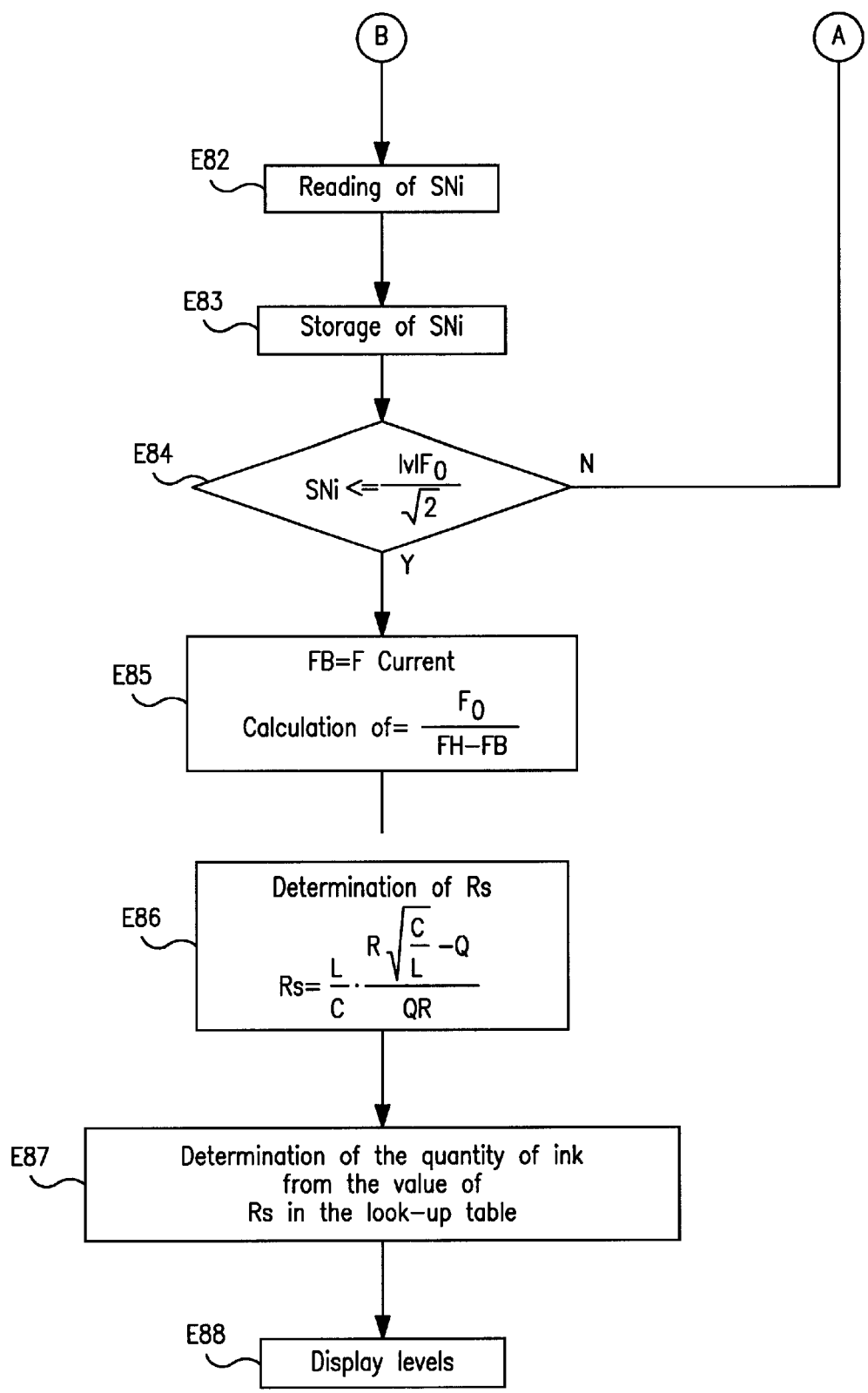

FIGS. 7a and 7b disclose an algorithm of the invention which is stored in the read-only memory 105 of the printing device. The algorithm comprises 19 steps E70 to E88 which are run through periodically, for example before the printing of a document. The algorithm determines the quantity of ink in the reservoir 112. It corresponds to a case where the gyrator keeps a fixed configuration (for example the configuration of FIG. 6) without any need for the connection 130; this algorithm applies also to a circuit similar to the one of FIG. 6, but without switch $SW_2$ and C2, and with switch $SW_1$ replaced by a permanent connection.

Step E70 consists of activating the frequency divider 118 to the gyrator 124.

At E71, the frequency of the oscillator 117 is decremented by one division unit via the divider 118 controlled by the central unit 100. The division step is fixed in advance (for example 200 Hz). Thus the frequency at the output of the divider 118 increases by 200 Hz at each decrement by one division unit.

At step E72, the signal SNi is read, which is then stored in RAM 109 at step E73.

At E74, the value of $SNi_{n+1}$ is compared with $SNi_n$. If $SNi_{n+1}$ is greater than $SNi_n$, then step E71 is returned to. Conversely, if $SNi_{n+1}$ is not greater than $SNi_n$, step E75 is passed to. In this case, this indicates that resonance was reached at the current frequency less 200 Hz, denoted $F_0$.

The last value captured corresponds to the resonance. It is denoted SNi max or nivx $F_0$.

At E75, the frequency corresponding to SNi max and the value of the amplitude SNi max are allocated to the variables $F_0$ and $nivF_0$ respectively. Next, the −3 dB passband is determined for identifying high and low frequencies.

At E76, the frequency of the oscillator 117 is decremented by one division unit via the divider 118 controlled by the central unit 100.

At E77, SNi is read, which is stored in RAM 109 at step E78.

At E79, it is determined whether SNi is less than or equal to $$\frac{nivxF_0}{\sqrt{2}}.$$

In the negative, step E76 is returned to. In the positive, step E80 is passed to, which consists of allocating the value of the current frequency to the variable FH and repositioning the frequency divider 118 to the division unit corresponding to $F_0$.

At E81, the frequency of the oscillator 117 is incremented by one division unit via the divider 118 controlled by the central unit 100. The value SNi is read at E82 and stored at E83.

At E84 it is determined whether SNi is less than or equal to $$\frac{nivxF_0}{\sqrt{2}}.$$

In the negative, step E81 is returned to. In the positive, step E85 is passed to, which consists of allocating the value of the current frequency to the variable FB and calculating the quality factor Q by means of the formula:

$$Q = \frac{F_0}{FH - FB}.$$

Step E86 makes it possible to calculate the value of the resistance (see below):

$$RS = \frac{L}{C} \cdot \frac{R\sqrt{\frac{C}{L}} - Q}{QR}$$

Step E87 makes it possible to determine the quantity of ink from the value of the resistance Rs by virtue of the look-up table TC stored in ROM 103, corresponding for example to the data or to an approximation of the curve in FIG. 5.

Finally, step E88 makes it possible to display the ink level.

Figure 8B:
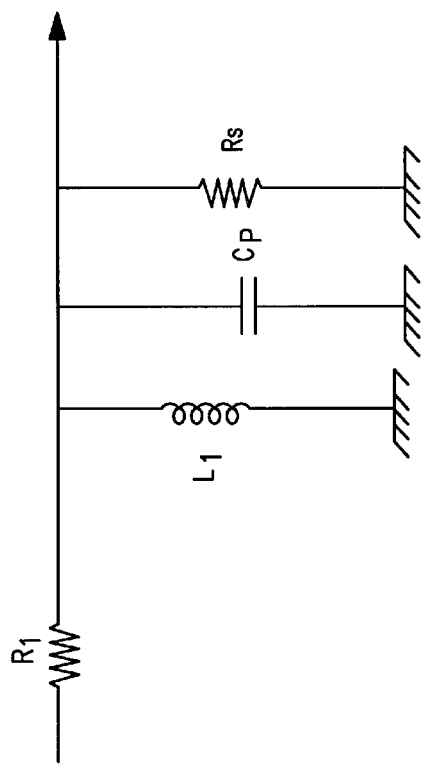
FIGS. 8a and 8b are an actual electrical diagram and an equivalent electrical diagram of the reservoir in its resonant circuit.
Figure 8A:
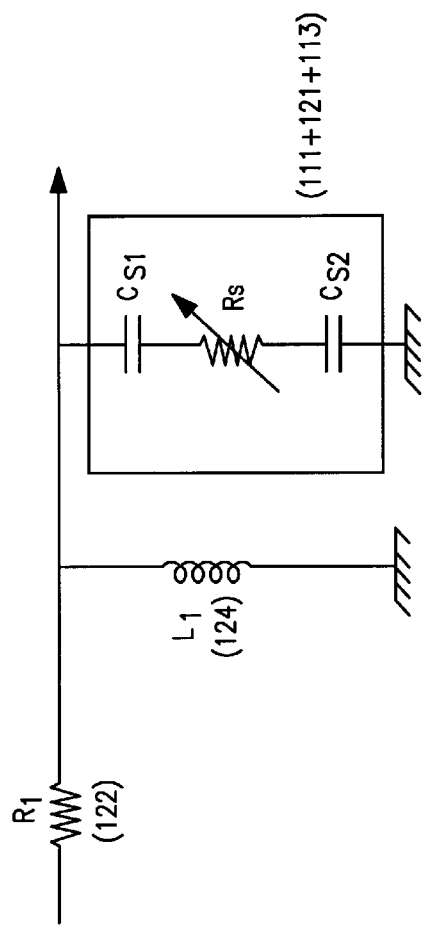

FIG. 8a depicts in detail the parallel circuit according to the invention.

The resistive element 122 is connected to the resonant circuit formed by the inductance created by the gyrator 124 and the ink cartridge. For reasons of simplification, the resistive element 119 will be referred to as $R_1$. $R_1$ is chosen with a very high value so as not to mask the variations in the ink resistance.

The inductance produced by the gyrator 124, here referred to as $L_1$, is chosen so as to have a very high value in order to be able to obtain a resonant frequency which is low and especially of excellent quality. This is because the series resistances existing on conventional inductors and the stray capacitances between the turns reduce the quality of the inductors, which could degrade the quality of the resistance measurement.

The capacitance $Cs_1$ represents the capacitor created by the metal plate 121, the wall of the ink cartridge and the ink. This capacitance varies little. If it varies as a function of the quantity of ink, adding a new lower-value capacitor in series would stabilise this variation.

This is generally unnecessary. The resistance Rs represents the resistance of the ink and the capacitor $Cs_2$ represents the capacitance between the ink and the print head connected to a predetermined potential. Let Cp be the capacitance equivalent to $Cs_1$ and $Cs_2$.

This series resistance can be assimilated to a parallel resistance of value:

$$R_p = \frac{L_1}{R_s Cp}$$

provided that Rs is very much less than Rp.

The quality factor for the circuit of FIG. 8b is of the form:

$$Q = \frac{R_1 Rp}{R_1 + Rp} \sqrt{\frac{Cp}{L_1}}$$

This being measured, Rp is derived therefrom, and finally:

$$Rs = \frac{L1}{RpCp}$$

which corresponds to the expression given above with regard to step E86 between the resistance sought and the quality factor.

In a variant, the resistance of the ink can be derived from the measurement of the amplitude S of the resonance peak. A person skilled in the art then knows how to derive the value of the resistance therefrom.

Figure 9A:
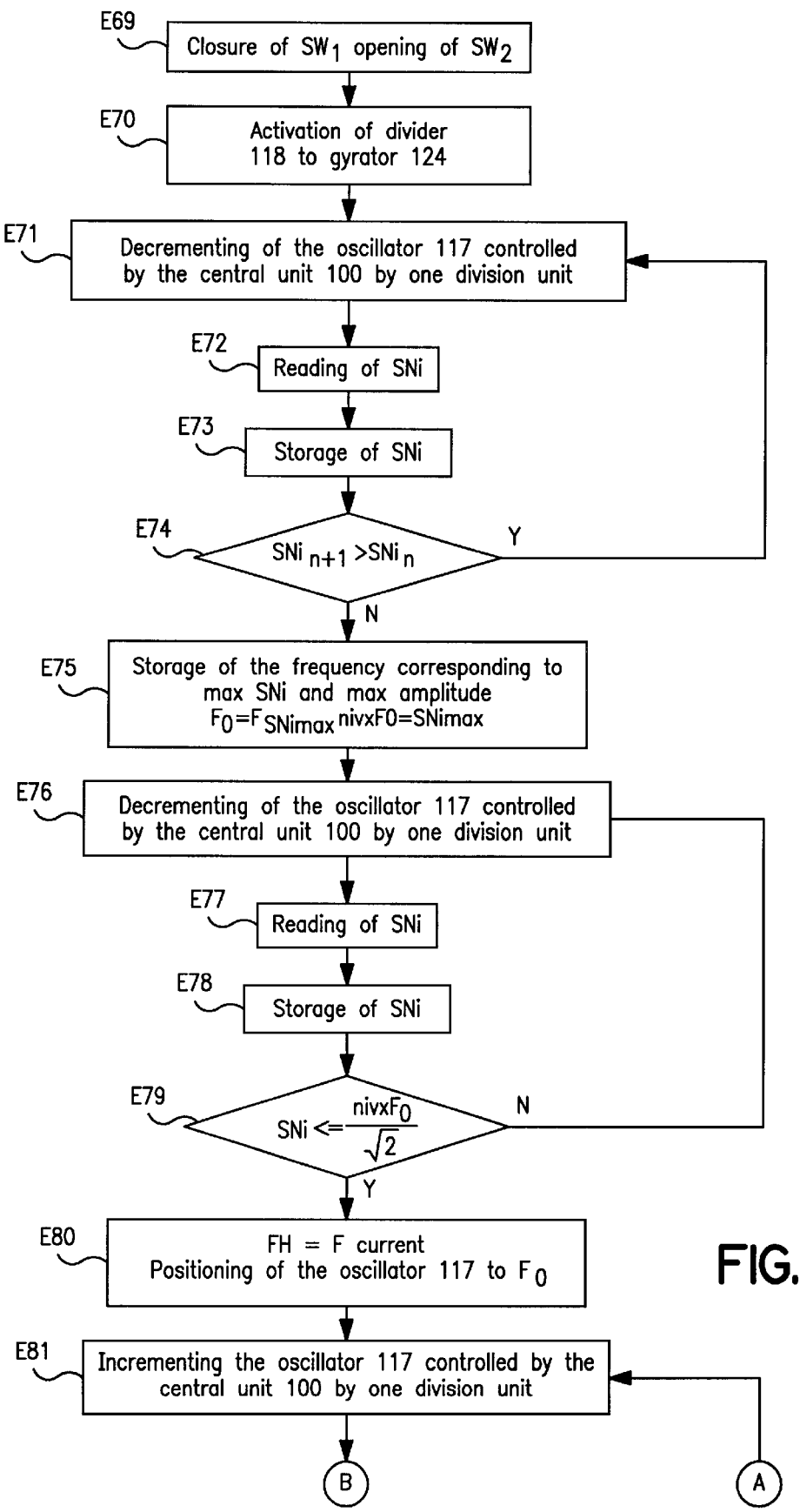
FIGS. 9a and 9b are conjointly a flow diagram of another program resident in read-only memory and implementing the invention.
Figure 9B:
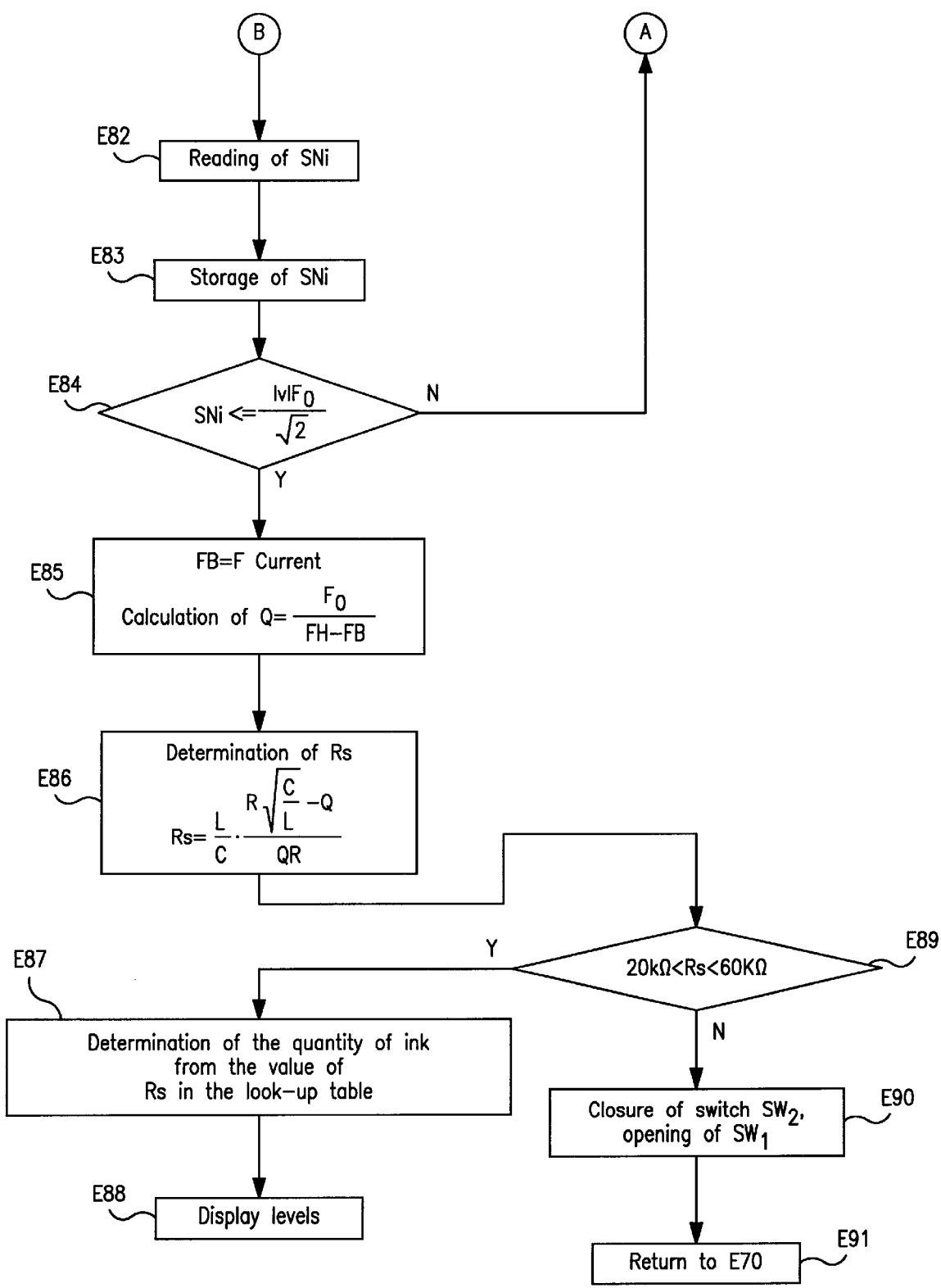

FIGS. 9a and 9b disclose another algorithm of the invention, which can be stored in the read-only memory 103 of the printing device. This algorithm comprises 23 steps E69 to E91 which are run periodically, for example before the printing of a document, for determining the quantity of ink in reservoir 112.

It takes profit of the possibility of changing the configuration of the gyrator, by action on the switches of FIG. 6 through connection 130.

A first step consists of positioning such switches in a starting configuration.

In the considered example, step E69 thus positions switches $SW_1$ and $SW_2$ respectively in the closed and open position (first state of the resonant circuit).

Steps E70 to E86 are identical to corresponding steps of FIGS. 7a and 7b.

In step E86, L corresponds to the notional inductor with the switches in the starting state.

As a difference to FIG. 7b, after step E86, the central unit passes to E89 in order to test the value of Rs. If this corresponds to a value contained within a predetermined range (for example between the extreme values of FIG. 5 without the peak), the central unit passes to step E87.

In the negative, it means that the signal has been corrupted by noise (case of peak a of FIG. 5), the central unit moves therefore the resonant frequency so as to place itself in a frequency range where the noise has less influence.

This is performed at step 90 (change of the switch configuration). At 91, the central unit initiates a new measurement, taking account this time of the new value of the inductance, by switching to step E70.

If, after such new measurement, the test E89 is still negative, and provided that a further change to the switch configuration is possible, a second new measurement is made with this new configuration. Otherwise an alarm may be, if appropriate, activated.

In practice, it is possible to select two sufficiently different configurations for the gyrator such that, if a possible perturbation disturbs the measure in one configuration, it has substantially no effect in the other configuration.

When the test is positive steps E87 and E88 are followed as in FIG. 7b.

The algorithms of FIGS. 7a and 7b, or 9a and 9b may be partially or totally stored in any information storage means able to cooperate with the Central Unit. This means may be read by a computer or processor ; it is included or not in the device and may be removable. As an example, it may comprise a magnetic tape, a floppy disc or a CD-ROM (Compact Disk with Read Only Memory).

What is claimed is:

1. Method of determining the quantity of an electrically conductive product contained in a reservoir made of electrically insulating material having at least one storage cavity, comprising:

providing a resonant circuit having a capacitive arrangement comprising at least part of the reservoir, the resonant circuit being connected to an excitation signal generator;

defining a measurement procedure according to which a plurality of excitation signals is applied to the resonant circuit having different frequencies included in a predetermined frequency range and a plurality of measurement signals is received at a measuring point in response to excitation signals, the predetermined frequency range being chosen so as to contain frequencies at which the resonant circuit is in resonance for a plurality of values of the quantity of product within a predetermined operating range;

defining a processing procedure according to which the value of a characteristic of the resonant circuit is identified from the plurality of measurement signals, a measurement of resistance formed by the product contained in the reservoir is derived from the value, and an instantaneous value of an item of information representing the quantity of product contained in the reservoir is derived using a pre-established correlation relationship;

effecting at least one determination cycles including triggering of the measurement procedure and the processing procedure; and capturing the instantaneous value of the item of information.

2. Method according to claim 1, wherein said characteristic is the resonance peak and the value of the characteristic is the amplitude of the resonance peak.

3. Method according to claim 1, wherein said characteristic is the resonance peak and the value of the characteristic is the quality factor Q of the resonant circuit.

4. Method according to claim 1, wherein the storage cavity contains a porous body, and the capacitive arrangement includes an electrode plate disposed oppositely and in the immediate vicinity of at least part of this porous body.

5. Method according to claim 1, wherein the resonant circuit is constructed so as to have a resonant frequency which varies with the quantity of product contained in the storage chamber, within a range from approximately 1 kHz to approximately 100 kHz.

6. Method according to claim 1, wherein the resonant circuit includes an artificial inductor which excludes a coil.

7. Method according to claim 6, wherein the artificial inductor is a circuit of the gyrator type.

8. Method according to claim 6, wherein the said capacitive arrangement and the artificial inductor are distinct from each other.

9. Method according to claim 1, wherein the resonant circuit is of the parallel type.

10. Method according to claim 9, wherein the said resonant circuit includes a capacitive arm and an inductive arm connected between a measuring point and earth.

11. Method according to claim 1, wherein the reservoir has a chamber delimiting the cavity, a product delivery duct connected to an output of the chamber and a print head, and wherein the capacitive arrangement includes two electrode plates, one of which is disposed in the immediate vicinity of a portion of chamber, and the other one of which is formed by the print head.

12. Method according to claim 11, further comprising the step of identifying an operating range of possible values which can be taken by the measurement signal when the quantity of product varies within a given range, and triggering an abnormality procedure when the instantaneous value of the measurement signal is outside this operating range.

13. Method according to claim 1, wherein the excitation signals are alternating signals.

14. Method according to claim 1, wherein the reservoir contains an electrically conductive ink and is constructed for use in a printing machine having a casing, and wherein the resonant circuit, including at least one metal part disposed oppositely to and in the immediate vicinity of part of the reservoir, is fixed with respect to the said casing.

15. Device for determining the quantity of an electrically conductive product contained in a storage cavity of a reservoir made of electrically insulating material, having:

a resonant circuit including a capacitive arrangement comprising at least part of the reservoir, said resonant circuit having, for different ones of possible values of the quantity of product contained in a given operating range, resonant frequencies contained within a predetermined frequency range;

an excitation signal generator connected to the resonant circuit and constructed to generate frequencies within the predetermined range;

measurement and processing means connected to said resonant circuit and to the excitation signal generator, said measurement and processing means for applying to the resonant circuit a plurality of excitation signals having frequencies within the predetermined range, for detecting a measurement signal in response to each excitation signal, for identifying from the measurement signals the value of a characteristic of the resonant circuit, deriving from the value of the characteristic a measurement of a resistance formed by the product contained in the reservoir, and for deriving therefrom the instantaneous value of an item of information representing the quantity of product contained in the reservoir from a pre-established correlation relationship; and means for capturing the instantaneous value of the said information.

16. Device according to claim 15, wherein the said characteristic is the resonance peak and the value of the characteristic is the amplitude of the peak.

17. Device according to claim 15, wherein the said characteristic is the resonance peak and the value of the characteristic is the quality factor Q of the resonant circuit.

18. Device according to claim 15, wherein the storage cavity contains a porous body, and wherein the capacitive arrangement includes an electrode plate disposed oppositely and in the immediate vicinity of the porous body.

19. Device according to claim 15, wherein the resonant circuit is constructed so as to have a resonant frequency which varies with the quantity of product contained in the storage cavity, within a range from approximately 1 kHz to approximately 100 kHz.

20. Device according to claim 15, wherein the resonant circuit includes an artificial inductor which excludes a coil.

21. Device according to claim 20, wherein the artificial inductor is a circuit of the gyrator type.

22. Device according to claim 20, wherein the capacitive arrangement and the artificial inductor are distinct from each other.

23. Device according to claim 15 wherein the resonant circuit is of the parallel type.

24. Device according to claim 23, wherein the resonant circuit includes a capacitive arm and an inductive arm connected between a measuring point and earth.

25. Device according to claim 15, wherein the reservoir comprises a chamber delimiting the cavity, a product delivery duct connected to an output of the chamber and a print head, and wherein the capacitive arrangement includes two electrode plates, one of which is disposed in the immediate vicinity of a portion of the chamber, and the other one of which is formed by the print head.

26. Device according to claim 25, further comprising means for storing data identifying an operating range of possible values which can be taken by the measurement signal when the quantity of product varies within a given range, and means designed so as to trigger an abnormality procedure when the instantaneous value of this measurement signal is outside this operating range.

27. Device according to claim 15, wherein the excitation signal generator is an alternating signal generator.

28. Device according to claim 15, wherein the reservoir contains an electrically conductive ink and is usable in a printing machine having a casing, and wherein the resonant circuit, including at least one metal part designed to be opposite to and in the immediate vicinity of a part of the reservoir, is mounted fixedly on the said casing.

29. Signal processing device for processing a signal from a reservoir containing an electrically conductive product and produced from an electrically insulating material, a resonant circuit including a capacitive arrangement comprising at least part of the reservoir, wherein the resonant circuit has, for different ones of possible values of the quantity of product contained in a given operating range, resonant frequencies contained within a predetermined frequency range, an excitation signal generator connected to the resonant circuit and constructed to generate various frequencies within the predetermined range, said signal processing device comprising:

measurement and processing means connectable to the resonant circuit and to the excitation signal generator, said measurement and processing means for applying to the resonant circuit a plurality of excitation signals having frequencies within the predetermined range, for detecting a measurement signal in response to each excitation signal, for identifying from the measurement signals the value of a characteristic of the resonant circuit, for deriving from the value of the characteristic a measurement of a resistance formed by the product contained in the reservoir, and for deriving therefrom the instantaneous value of an item of information representing the quantity of product contained in the reservoir from a pre-established correlation relationship; and means for capturing the instantaneous value of the said item of information.

30. Device for supplying electrically conductive product having a reservoir containing the product and produced from electrically insulating material; and a device for determining the quantity of product contained in the reservoir according to claim 15.

31. Image formation device having a reservoir containing an electrically conductive marking product and produced from electrically insulating material; and a device for determining the quantity of product contained in the reservoir according to claim 15.

32. Printing system having an electrically conductive ink reservoir, a print head connected to the reservoir, control means connected to the print head and a device according to claim 15.

33. Office machine for receivably mounting an ink reservoir, having a device for determining the quantity of product contained in this ink reservoir according to claim 15.

34. Office signal processing unit for processing a signal from an ink reservoir, an excitation signal generator, and a resonant circuit connected to the excitation signal generator including a capacitive arrangement containing at least part of the ink reservoir, said office signal processing unit having a processing device according to claim 29.

35. Method of determining the quantity of an electrically conductive product contained in a reservoir made of electrically insulating material having at least one storage cavity, comprising:

providing a resonant circuit including a capacitive arrangement comprising at least part of the reservoir, the resonant circuit having at least two structurally different resonance states, the resonant circuit being connected to an excitation signal generator and to means adapted to cause the resonant circuit to change from a first resonance state to at least one other resonance state;

defining a measurement procedure according to which at least one excitation signal is applied to the resonant circuit and at least one measurement signal is received at a measurement point in response to the excitation signal, the excitation signal being such that the measurement signal varies univocally with the quantity of product contained in the storage cavity;

defining a processing procedure for each state of the resonant circuit, each such processing procedure including a first step of identifying, from the measurement signal or signals, the value of a characteristic of the capacitive arrangement, and a second step of deriving therefrom the instantaneous value of an item of information representing the quantity of product contained in the reservoir from a pre-established correlation relationship between values of the characteristic and values of the quantity of product in the storage cavity;

defining a verification procedure of comparing the value of the characteristic or the item of information with a possible range of values; and effecting at least one determination cycle, the determination cycle including the steps of setting the resonant circuit in its first resonance state, triggering the measurement procedure and optionally the processing procedure associated with the first resonance state, and triggering the verification procedure, wherein if the verification is positive, the instantaneous value of the item of information is captured, and wherein if the verification procedure is not positive, the resonance state of the resonant circuit is changed and the measurement procedure and then the processing procedure is triggered for the new resonance state of the resonant circuit and the new instantaneous value of the said item of information is captured.

36. Method according to claim 35, wherein the verification procedure includes testing the value of the information given by the processing procedure for the first state.

37. Method according to claim 35, wherein the determination cycle also includes, where the verification is negative, a step of triggering the verification procedure once again after the change of state of the resonant circuit.

38. Method according to claim 35, wherein the resonant circuit includes at least three possible states.

39. Method according to claim 35, wherein a change in the resonant circuit is begun by acting on switches that switchably connect components within the resonant circuit.

40. Method according to claim 35, wherein the measurement procedure includes application to the resonant circuit of a plurality of signals having different frequencies, in a frequency band containing the frequencies for which the resonant circuit is resonant in each state and for different values of the quantity of product.

41. Method according to claim 35, wherein a first step of the processing procedure comprises identifying the value of the capacitance formed by the reservoir in the capacitive arrangement.

42. Method according to claim 35, wherein a first step of the processing procedure comprises identifying the value of the resistance formed by the reservoir in the capacitive arrangement.

43. Method according to claim 42, wherein the storage cavity contains a porous body and at least part of the porous body is disposed in the capacitive arrangement.

44. Method according to claim 35, wherein the resonant circuit includes a resonant frequency which varies, with the quantity of product contained in the storage chamber, within a range from approximately 1 kHz to approximately 100 kHz.

45. Method according to claim 35, wherein the resonant circuit includes an artificial inductor which excludes a coil.

46. Method according to claim 45, wherein the artificial inductor is a circuit of the gyrator type.

47. Method according to claim 45, wherein said capacitive arrangement and the artificial inductor are distinct from each other.

48. Method according to claim 45, wherein the change in the state of the resonant circuit is controlled by acting on a component forming part of the artificial inductor.

49. Method according to claim 35, wherein the reservoir comprises a chamber delimiting the cavity, a product delivery duct connected to an output of the reservoir and a print head, and wherein the capacitive arrangement includes two electrode plates, one of which is disposed in the immediate vicinity of a portion of the chamber, and the other one of which is formed by the print head.

50. Method according to claim 35, wherein the reservoir contains an electrically conductive ink and usable in a printing machine having a casing, and wherein the resonant circuit, including at least one electrode plate disposed oppositely and in the immediate vicinity of part of the reservoir, is disposed so as to be fixed with respect to the casing.

51. Device for determining the quantity of an electrically conductive product contained in a storage cavity of a reservoir made of electrically insulated material, said device comprising:
 a resonant circuit including a capacitive arrangement designed to comprise at least part of this reservoir, said resonant circuit having at least a first resonance state and a second resonance state structurally different from the first resonance state;
 control means for causing said resonant circuit to change from the first resonance state to the second resonance state;
 an excitation signal generator connected to said resonant circuit;
 measurement and processing means connected to said resonant circuit, to the excitation signal generator and to the control means, said measurement and processing means for applying at least one excitation signal to the resonant circuit, receiving a measurement signal in response to each excitation signal, identifying the value of a characteristic of this capacitive arrangement, and deriving therefrom an item of information representing the quantity of product contained in the storage cavity using a pre-established correlation relationship;
 verification means for comparing the value of the characteristic or the item of information with a range of possible values; and
 determination means for setting the resonant circuit to its first resonance state, triggering measurement by said measurement and processing means, and triggering verification by said verification means;
 wherein if the verification is positive, said determination means captures the instantaneous value of the item of information; and
 wherein if verification is not positive, said determination means changes resonance state of the resonant circuit and triggers once again the measurement procedure and then the processing procedure for the changed resonance state of the resonant circuit, and captures the new instantaneous value of the item of information.

52. Device according to claim 51, wherein the verification means tests the value of the information given by the measurement and processing means.

53. Device according to claim 51, wherein the determination means also triggers, where the verification is negative, a verification after the change of state of the resonant circuit.

54. Device according to claim 51, wherein the resonant circuit includes at least three possible states.

55. Device according to claim 51, wherein the resonant circuit has components connected therein by switches, and said switches are controlled by said control means.

56. Device according to claim 51, wherein the excitation signal generator generates a plurality of signals having different frequencies, in a frequency band containing the frequencies for which said resonant circuit is resonant in each state and for pre-established ones of various values of the quantity of product.

57. Device according to claim 51, wherein the measurement and processing means identifies the value of the capacitance formed by the reservoir in the capacitive arrangement.

58. Device according to claim 51, wherein the measurement and processing means identifies the value of the resistance formed by the reservoir in the capacitive arrangement.

59. Device according to claim 58, wherein the storage cavity contains a porous body, at least part of which is disposed in the capacitive arrangement.

60. Device according to claim 51, wherein the resonant circuit has a resonant frequency which varies with the quantity of product contained in the storage chamber, within a range from approximately 1 kHz to approximately 100 kHz.

61. Device according to claim 51; wherein the resonant circuit includes an artificial inductor which excludes a coil.

62. Device according to claim 61, wherein the artificial inductor is a circuit of the gyrator type.

63. Device according to claim 61, wherein said capacitive arrangement and the artificial inductor are distinct from each other.

64. Device according to claim 61, wherein the change of state of the resonant circuit is controlled by acting on a component forming part of the artificial inductor.

65. Device according to claim 51, wherein the reservoir comprises a chamber delimiting the cavity, a product delivery duct connected to an output of the reservoir and a print head, and wherein the capacitive arrangement includes two electrode plates, one of which is disposed in the immediate vicinity of a portion of the chamber, and the other one of which is formed by the print head.

66. Device according to claim 51, wherein the reservoir contains an electrically conductive ink and is usable in a printing machine having a casing, and wherein the resonant circuit, including at least one electrode plate disposed oppositely and in the immediate vicinity of part of the reservoir, is fixed with respect to the said casing.

67. Signal processing device for processing a signal from a reservoir made of electrically insulating material having a storage cavity containing an electrically conductive product, a resonant circuit including a capacitive arrangement comprising at least part of this reservoir in which the resonant circuit has at least a first resonance state and a second resonance state structurally different from the first resonance state, control means for causing the resonant circuit at least to change from the first resonance state to the second resonance state and an excitation signal generator connected to the resonant circuit, said signal processing device comprising:

measurement and processing means connectable to the resonant circuit, to the excitation signal generator, and to the control means, said measurement and processing means for applying at least one excitation signal to the resonant circuit, receiving a measurement signal in response to each excitation signal, identifying the value of a characteristic of this capacitive arrangement, and deriving therefrom an item of information representing the quantity of product contained in the storage cavity using a pre-established correlation relationship;

verification means for comparing the value of the characteristic or the item of information with a range of possible values; and determination means for setting the resonant circuit to its first resonance state, triggering measurement by said measurement and processing means, and triggering verification by said verification means;

wherein if the verification is positive, said determination means captures the instantaneous value of the item of information; and wherein if verification is not positive, said determination means changes resonance state of the resonant circuit and triggers once again the measurement procedure and then the processing procedure for the changed resonance state of the resonant circuit, and captures the new instantaneous value of the item of information.

68. Device for supplying electrically conductive product having a reservoir containing the product and produced from electrically insulating material; and a device for determining the quantity of product contained in the reservoir according to claim 51.

69. Image formation device having a reservoir containing an electrically conductive marking product and produced from electrically insulating material; and a device for determining the quantity of product contained in the reservoir according to claim 51.

70. Printing system having a reservoir of electrically conductive ink, a print head connected to the reservoir, control means connected to the print head and a device according to claim 51.

71. Office machine for receivable mounting an ink reservoir, having a device for determining the quantity of product contained in the ink reservoir according to claim 51.

72. Office signal processing unit for processing a signal from an ink reservoir, an excitation signal generator, and a resonant circuit connected to the excitation signal generator including a capacitive arrangement containing at least part of the ink reservoir, said office signal processing unit having a processing device according to claim 67.

73. Storage medium storing a program for determining the quantity of an electrically conductive product contained in a reservoir made of an electrically insulating material, said program enabling the steps of the method of claim 1.

74. Storage medium according to claim 73 wherein said medium is detachably mountable in a device for determining determining the quantity of an electrically conductive product contained in a reservoir made of an electrically insulating material.

75. Storage medium according to claim 73 wherein said medium is a floppy disk or a CD-ROM.

76. Storage medium storing a program for determining the quantity of an electrically conductive product contained in a reservoir made of an electrically insulating material, said program enabling the steps of the method of claim 35.

77. Storage medium according to claim 76 wherein said medium is detachably mountable in a device for determining determining the quantity of an electrically conductive product contained in a reservoir made of an electrically insulating material.

78. Storage medium according to claim 76 wherein said medium is a floppy disk or a CD-ROM.

\* \* \* \* \*

UNITED STATES PATENT AND TRADEMARK OFFICE
CERTIFICATE OF CORRECTION

PATENT NO. : 6,339,335 B1
DATED : January 15, 2002
INVENTOR(S) : Marie-Hélène Froger et al.

It is certified that error appears in the above-identified patent and that said Letters Patent is hereby corrected as shown below:

<u>Title page,</u>
Item [75], Inventor, the first-named inventor should read -- Marie-Hélène Froger --.
Item [57], ABSTRACT, should be rewritten as follows:

--Determining the quantity of an electrically conductive product contained in a reservoir made of an electrically insulating material having at least one storage cavity. A resonant circuit is provided, the resonant circuit having a capacitive arrangement formed from at least part of the reservoir and being connected to an excitation signal generator. A processing procedure is defined which processes based on a plurality of measurement signals received at a measuring point in response to excitation signals applied to the resonant circuit with different frequencies included in the predetermined frequency range. According to the processing procedure, the value of a characteristic of the resonant circuit is identified from the plurality of measurement signals, a measurement of resistance is derived based on the identified value, and an instantaneous value of an item of information representing the quantity of product contained in the reservoir is derived using a pre-established correlation law between the derived value and the item of information. Using the processing procedure, at least one determination cycle is effected, with the determination cycle including the steps of triggering a measurement procedure to obtain the measurement signals, triggering the processing procedure, and capturing the instantaneous value of the item of information.--

<u>Column 1,</u>
Line 41, "manufacture" should read -- manufacturer --; and
Line 55, "an" should read -- a --.

<u>Column 10,</u>
Line 60, "it" should read -- is --.

<u>Column 12,</u>
Line 66, "E84" should read -- E84, --.

<u>Column 14,</u>
Line 9, "$R_s = \frac{L1}{R_p C_p}$" should read -- $R_s = \frac{L_1}{R_p C_p}$ --;

Line 25, "profit" should read -- advantage --;
Line 46, "step 90" should read -- step E90 --; and
Line 47, "91," should read -- step E91, --.

UNITED STATES PATENT AND TRADEMARK OFFICE
CERTIFICATE OF CORRECTION

PATENT NO.   : 6,339,335 B1
DATED        : January 15, 2002
INVENTOR(S)  : Marie-Hélène Froger et al.

It is certified that error appears in the above-identified patent and that said Letters Patent is hereby corrected as shown below:

Column 15,
Line 29, "cycles" should read -- cycle, --; and
Line 66, "chamber," should read -- the chamber, --.

Column 19,
Line 45, "usable" should read -- is usable --.

Column 22,
Line 18, "receivable" should read -- recievably --;
Line 33, "determining" should be deleted; and
Line 45, "determining" should be deleted.

Signed and Sealed this

First Day of April, 2003

JAMES E. ROGAN
*Director of the United States Patent and Trademark Office*